(12) United States Patent
Loomis et al.

(10) Patent No.: US 11,750,470 B2
(45) Date of Patent: Sep. 5, 2023

(54) UPDATE COMPLIANCE INFORMATION WHILE IN PROVISIONAL STATE

(71) Applicant: Twilio Inc., San Francisco, CA (US)

(72) Inventors: Patrick Loomis, Oakland, CA (US); Camilo Alvarez, Bogotá (CO); Samuel Salazar, Bogotá (CO); John Jairo Martinez, Bogotá (CO); Luz Alba Gallo Herrán, Bogotá (CO); David Villamizar, Bogotá (CO); Daniela Beltrán, Medellín (CO)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/650,654

(22) Filed: Feb. 10, 2022

(65) Prior Publication Data

US 2023/0254222 A1 Aug. 10, 2023

(51) Int. Cl.
*H04L 41/28* (2022.01)
*H04L 41/12* (2022.01)
*H04L 41/18* (2022.01)

(52) U.S. Cl.
CPC .............. *H04L 41/28* (2013.01); *H04L 41/12* (2013.01); *H04L 41/18* (2013.01)

(58) Field of Classification Search
CPC .......... H04L 41/28; H04L 41/12; H04L 41/18
See application file for complete search history.

(56) References Cited

U.S. PATENT DOCUMENTS

| 9,749,331 | B1 * | 8/2017 | Koeten | H04L 63/0815 |
| 10,601,872 | B1 * | 3/2020 | Natarajan | H04W 12/08 |
| 10,735,451 | B1 * | 8/2020 | Baker | H04L 63/20 |
| 2016/0088021 | A1 * | 3/2016 | Jayanti Venkata | G06F 21/30 726/1 |
| 2021/0141913 | A1 * | 5/2021 | Mosconi | G06F 21/6245 |

* cited by examiner

*Primary Examiner* — Tonia L Dollinger
*Assistant Examiner* — Joseph M Cousins
(74) *Attorney, Agent, or Firm* — Schwegman Lundberg & Woessner, P.A.

(57) ABSTRACT

Disclosed are systems, methods, and computer-readable media for ensuring that one or more compliance information bundles associated with one or more end-point identifiers maintain compliance with one or more regulations. It is detected that a rules engine has been updated with a new regulation. Based on an identification that one or more compliance information bundles associated with the one or more end-point identifiers will not be compliant with the new regulation after an expiration of a grace period associated with the new regulation, a status associated with each one or more compliance information bundles is changed to a provisionally-approved status. The changing of the status associated with each of the one or more compliance information bundles to the provisionally-approved status causes each of the one or more compliance information bundles to be treated, temporarily like the status of each the one or more compliance information bundles is an approved status.

20 Claims, 11 Drawing Sheets

| Field | Type | Null | Key | Default | Extra |
|---|---|---|---|---|---|
| AutoId | int(11) | No | PRI | NULL | auto_increment |
| Sid | char(34) | No | UNI | NULL | |
| AccountSid | char(34) | No | MUL | NULL | |
| RegulationSid | char(34) | No | | NULL | |
| FriendlyName | varchar(255) | No | | NULL | |
| Email | varchar(255) | No | | NULL | |
| StatusCallback | varchar(255) | Yes | | NULL | |
| Version | int(10) | No | | NULL | |
| Status | varchar(50) | Yes | | NULL | |
| FailureReason | varchar(2048) | Yes | | NULL | |
| CreatedBy | char(34) | Yes | | NULL | |
| Reviewer | char(34) | Yes | | NULL | |
| DataCreated | timestamp(3) | No | MUL | 0000-00-00 00:00:00.000 | |
| DateUpdated | timestamp(3) | No | | 0000-00-00 00:00:00.000 | |
| Owner | varchar(255) | Yes | MUL | NULL | |
| Deleted | tinyint(1) | No | | 0 | |
| DeletedBy | char(34) | Yes | | NULL | |
| DateDeleted | timestamp(3) | Yes | | NULL | |
| Comments | varchar(255) | Yes | | NULL | |
| ValidUntil | timestamp(3) | Yes | | NULL | |
| RegulationVersion | int(10) | Yes | | NULL | |

FIG. 5

UPDATE COMPLIANCE INFORMATION WHILE IN PROVISIONAL STATE

TECHNICAL FIELD

An embodiment of the present subject matter relates generally to management of compliance information with communications and, more specifically, to designating compliance information as provisionally-compliant with new regulatory requirements applicable, such as during a time period in which compliance information pertaining to the regulatory requirement may be updated to bring the communication information into compliance with the new regulatory requirements.

BACKGROUND

Customers of a customer engagement platform, telephony platform, or other platform, such as a platform supported or provided by Twilio, Inc., may lease, provision, port, or host communication channels (e.g., including end-point identifiers, such as phone numbers, short codes, alphanumeric sender ids, and over-the-top) via the platform. These customers, which may include independent software vendors (ISVs), global enterprises, non-governmental organizations (NGOs), governmental bodies, or other users of the platform, may be required to keep regulatory compliance information for these communication channels up to date (e.g., so that the customers can establish that their uses of the end-point identifiers comply with regulatory requirements associated with the end-point identifiers).

Regulatory requirements associated with the end-point identifiers may be established by a number regulatory authority, such as a government authority that regulates communication in a country's communication network. Failure of the customers to provide or keep the necessary regulatory compliance information up to date can have negative consequences, such as with respect to a compliance status of the end-point identifiers or an ability of the customers to provision the endpoint identifiers. In some cases, this failure may result in the end-point identifiers being reclaimed by the platform such that the customers can no longer use them.

It may be especially difficult for customers to keep compliance information up to date when they manage multiple large quantities of end-point identifiers and/or when regulatory requirements change frequently.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5. is an example database schema or table corresponding to a compliance information bundle.

DETAILED DESCRIPTION

Figure 1:
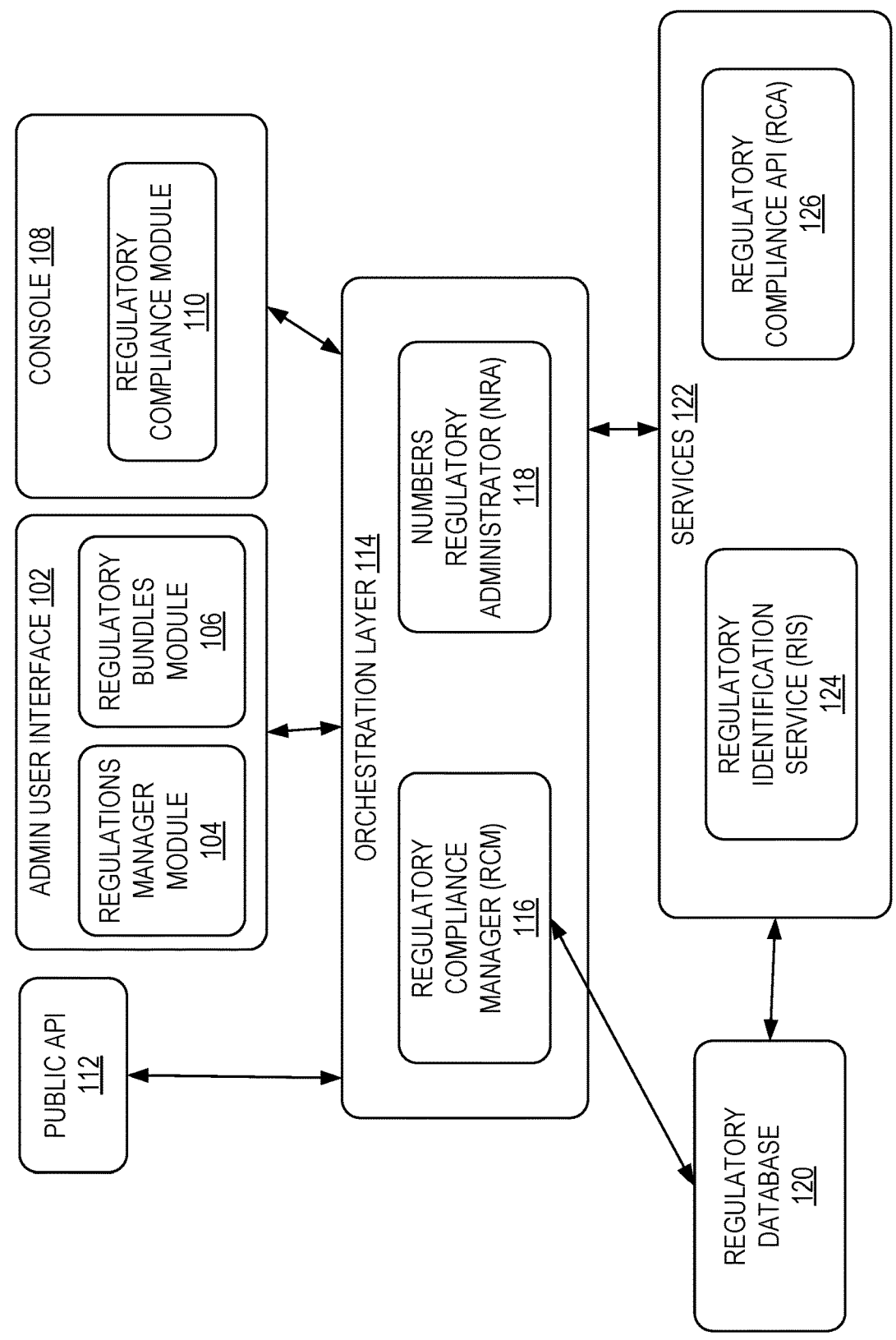
FIG. 1 is a block diagram depicting an example system for implementing one or more of the operations or methodologies described herein

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skills in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for ensuring that a "bundle" (e.g., a data container of compliance information or metadata) associated with an end-point identifier maintains compliance with one or more regulations (e.g., such that the endpoint identifier is not reclaimed by a regulatory authority). It is detected that a rules engine has been updated with a new regulation. Based on an identification that one or more bundles associated with the end-point identifiers, such as phone numbers, Long Codes, Short Codes, Alphanumeric Sender Identifiers, WhatsApp identifiers, SIP Domains, email aliases, A2P Messaging identifiers, SHAKEN/STIR identifiers, CNAM identifiers, and so on, will not be compliant with the new regulation after an expiration of a grace period associated with the new regulation, a state associated with each of the one or more bundles or end-point identifiers is changed to a provisionally-approved state(e.g., based on an approval having been previously received). The changing of the state associated with each of the one or more bundles or end-point identifiers to the provisionally-approved state causes each of the one or more bundles or end-point identifiers to be treated as valid until the expiration of the grace period, as if the state of each of the one or more bundles or end-point identifiers is an approved state.

In example embodiments, a compliance information bundle (or a regulatory bundle) is a data structure or data container that is configured to represent a set of supporting documents (e.g., compliance information), a set of end users, and/or a set of metadata. In example embodiments, the compliance information may be associated with one or more regulations/policies, such as regulations issued by a regulatory authority (e.g., a governmental authority). In example embodiments, an end user is an individual or entity that receives a call or message associated with an end-point identifier (e.g., a phone number) at a communication end-point (e.g., a client device or client application). In example embodiments, an end-point identifier is an identifier associated with a communication channel (e.g., long codes, short codes, sender identifiers, caller identifiers, WhatsApp identifiers, and so on). In example embodiments, a bundle may be associated with an address resource. In example embodiments, the address resource may represent a name and/or address of a customer who manages the bundle through the disclosed platform.

FIG. 1 is a block diagram depicting an example system for implementing one or more of the operations or methodologies described herein. To avoid obscuring the inventive subject matter with unnecessary detail, various functional components (e.g., components) that are not germane to conveying an understanding of the inventive subject matter have been omitted from FIG. 1. However, a skilled artisan will readily recognize that various additional functional components may be supported by the system to facilitate additional functionality that is not specifically described herein. Furthermore, the various functional components depicted in FIG. 1 may reside on a single computing device or may be distributed across several computing devices in various arrangements such as those used in cloud-based architectures.

In example embodiments, an administrative user interface 102 is configured to provide administrative functionality associated with one or more bundles associated with one or more end-point identifiers. In example embodiments, the administrative user interface 102 includes a regulations manager module 104 and a regulatory bundles module 106. In example embodiments, the regulations manager module 104 is configured to operate a rules engine (e.g., via regulatory compliance API (RCA) 126). In example embodiments, the regulatory bundles module 106 is configured to review, approve, and reject one or more bundles (e.g., based on input of an administrator).

In example embodiments, a public API 112 is configured to allow users (e.g., client applications) to fetch, update, and/or submit regulatory documentation. In example embodiments, the public API 112 is a REST API. In example embodiments, the public API 112 is publicly exposed (e.g., for access by one or more client applications, such as a client application developed by an ISV).

In example embodiments, an orchestration layer 114 is configured to orchestrate regulation changes and regulatory actions required after a regulation change. In example embodiments, the orchestration layer 114 includes a regulatory compliance manager (RCM) 116 and a numbers regulatory administrator (NRA) 118. In example embodiments, the RCM 116 is configured to orchestrate one or more regulatory compliance processes described herein. In example embodiments, the NRA is configured to orchestrate one or more regulatory downstream (e.g., to expose custom business logic associated with one or more end-point identifiers associated with a bundle).

In example embodiments, a regulatory database 120 is configured to store regulatory data. In example embodiments, the regulatory data may be stored in multiple schemas or tables. For example, a first schema or table, such as a regulatory identities schema, may be configured to store regulatory documentation, and a second schema or table, such as a regulatory compliance schema, may be configured to store regulations, evaluations, and/or regulated items. In example embodiments, the regulatory database 120 may be a MySQL database.

In example embodiments, one or more services 122 may be configured to provide functions for managing the rules engine and/or regulatory documentation. In example embodiments, the one or more services 122 may include a regulatory identification service (RIS) 124 and the regulatory compliance API (RCA) 126. In example embodiments, the RIS 124 may be configured to manage regulatory documentation, including bundles, regulatory documents, and regulatory identities. In example embodiments, the RCA 126 may be configured to manage the rules engine responsible for the regulations, evaluations, and regulated items.

Figure 2:
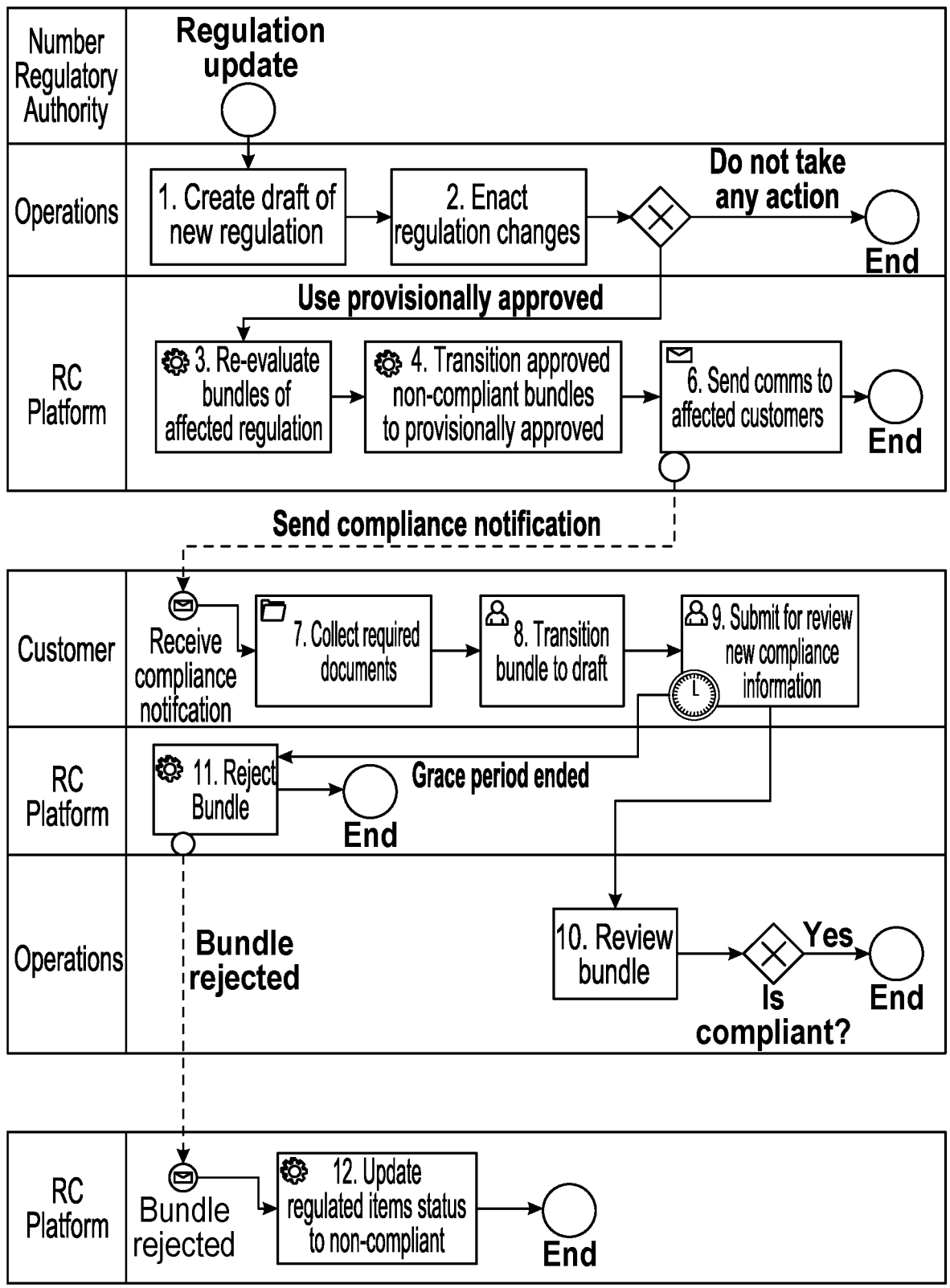
FIG. 2 is a block diagram depicting an example regulation update process.

FIG. 2 is a block diagram depicting an example regulation update process. At operation 1, a number regulatory authority issues one or more regulation updates. At operation 2, one or more drafts of the new regulations are generated and/or the one or more drafts are enacted (e.g., based on an action of an administrator). At operation 3, compliance information associated with the numbers is reevaluated to determine whether it is still compliant with their associated regulations in view of the one or more regulation updates. At operation 4, statuses of any compliance information that will no longer be compliant with their associated regulations in view of the one or more regulation updates after an expiration of a grace period associated with the one or more regulation updates are each changed to a provisionally-compliant status. At operation 5 communications are sent to customers associated with the one or more compliance information bundles having statuses that have been changed to the provisionally-compliant status. In example embodiments, the communications indicate, for each compliance information bundle, a reason for the change of state to provisional-compliance and an action that the customer can take to restore the status of the compliance information bundle to an approved status.

At operation 6, customers receive the communications sent at operation 5. At operation 7, customers collect any required documents, such as new compliance information associated with the one or more regulation updates. At operation 8, the bundle is transitioned to a draft status. At operation 9, customers submit compliance information and the required documents for review.

At operation 10, if the grace period associated with the one or more regulations updates did not expire before the customer submitted the compliance information and the required documents for review, the compliance information and the required document are reviewed. If the information is compliant with the one or more regulation updates, the status of the compliance information is changed to approved. Otherwise, the compliance information is rejected. Additionally, as discussed below with respect to FIG. 7, compliance information or item assignments may be copied from a bundle copy to a destination bundle. The bundle copy may then be deleted.

At operation 11, if the grace period associated with the one or more regulation updates expired before the customer submitted the compliance information and the required documents for review, the compliance information is rejected.

At operation 12, if the compliance information is rejected, the regulated items (e.g., end-point identifiers) included in the compliance information are each marked as non-compliant. In example embodiments, based on the marking of a regulated item as non-compliant, the regulated item may subsequently be reclaimed such that the customer can no longer use them.

Figure 3:
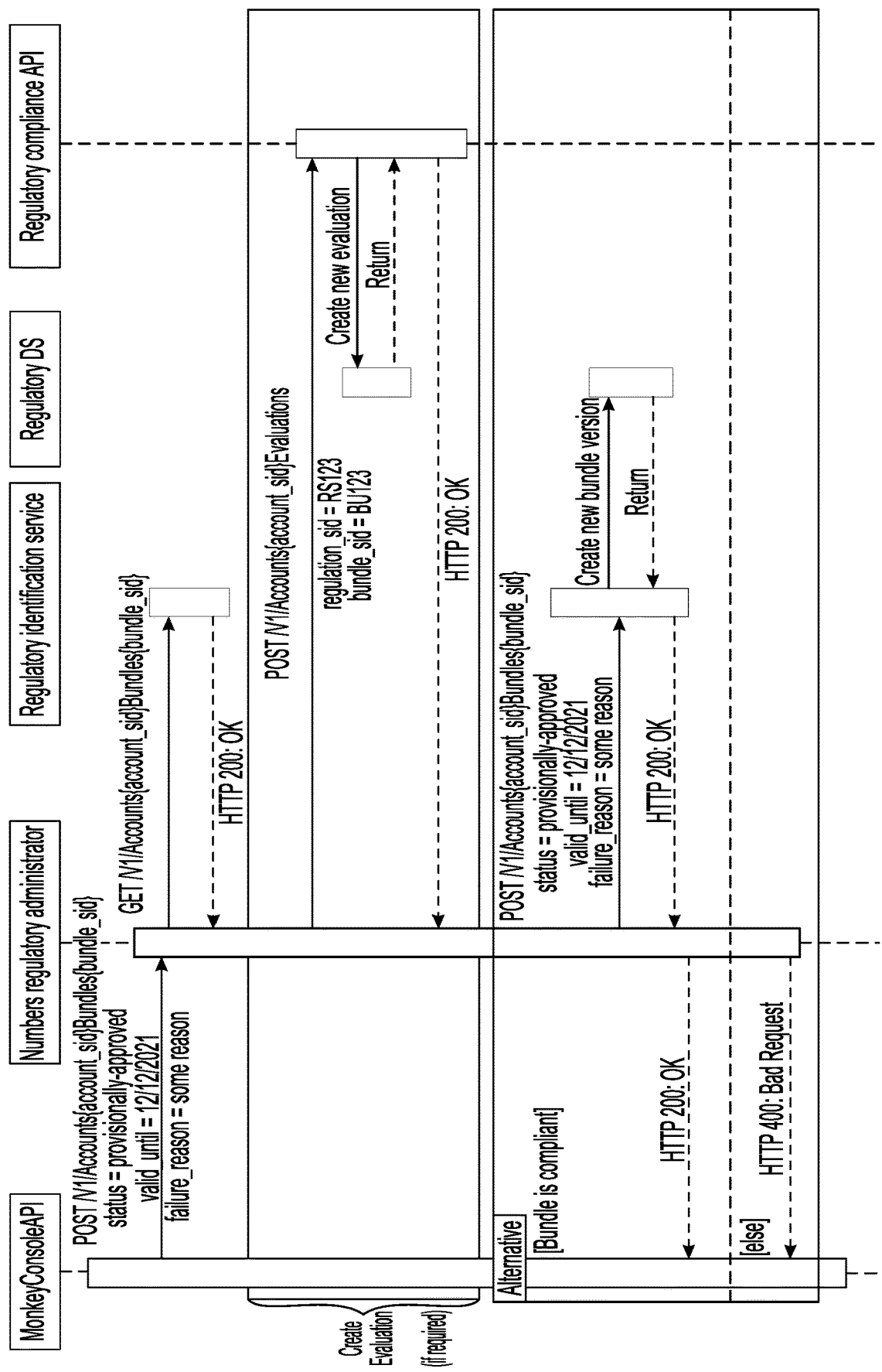
FIG. 3 is a sequence diagram depicting an example process for updating one or more statuses of one or more compliance information bundles.

FIG. 3 is a sequence diagram depicting an example process for updating one or more statuses of one or more compliance information bundles. The NRA receives a command (e.g., via the administrative user interface, console, or public API) to set the status of a bundle or its associated end-point identifiers to provisionally approved. The command may specify one or more of an account identifier (e.g., "account_sid"), a bundle identifier (e.g., "bundle_sid"), a grace period (e.g., a "valid until" date), or a failure reason.

The NRA sends a command requesting the bundle from the RIS. The command may include the account identifier and/or the bundle identifier.

Based on a determination to evaluate the bundle, the NRA sends a command to the RCA requesting the evaluation. The command may include one or more of the account identifier, the bundle identifier, or a regulation identifier. In example embodiments, if no regulation identifier is provided, the regulation version currently set on the bundle is used, not the latest version of the regulation.

In response to the command requesting the evaluation, the RCA creates a new evaluation of the bundle. For example, the RCA evaluates one or more queries with respect to the regulatory database to determine if the identified bundle is compliant with the identified regulation.

Based on a determination the bundle is not compliant with the identified regulation after an expiration of a grace period associated with the identified regulation, the NRA sends a command to the RIS requesting that the status of the bundle be set to a provisionally-approved status.

In response to the command requesting the change of the status of the bundle, the RIS sends a command to the regulatory database requesting creation of a new version of the bundle.

Figure 4A:
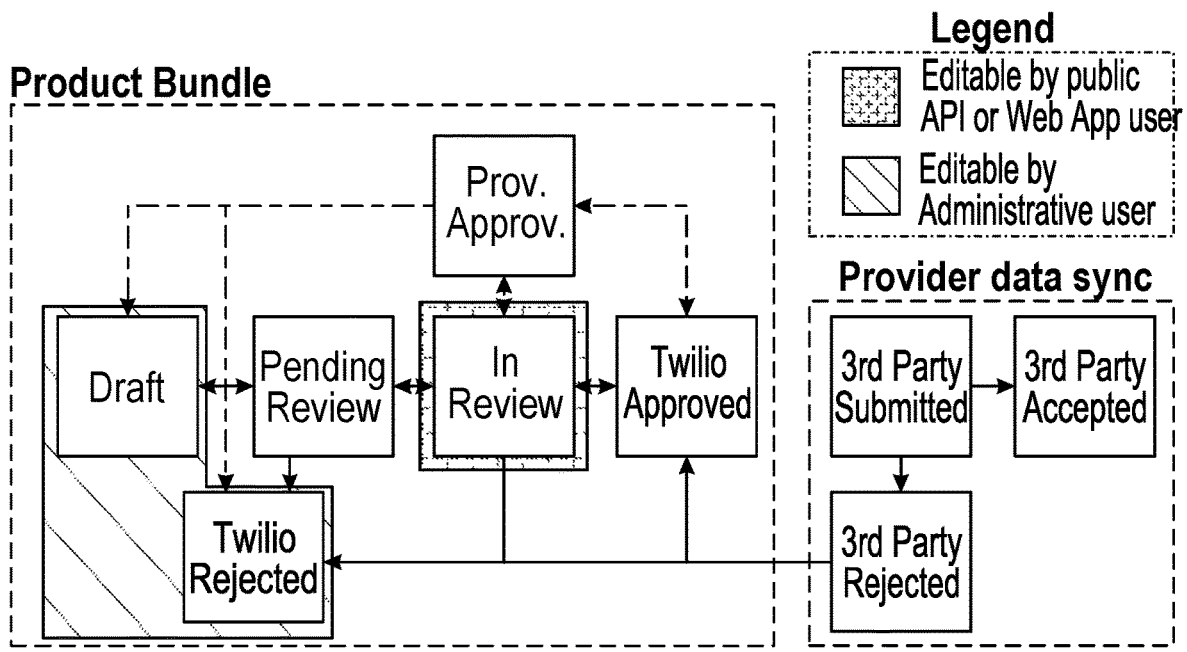
FIG. 4A is a block diagram of an example state machine or enumerated data structure for modeling the status of a bundle when the provisionally-approved status is explicitly determined.

FIG. 4A depicts a block diagram of an example state machine or enumerated data structure for modeling the status of a bundle when the provisionally-approved status is explicitly determined. As indicated, various transitions are supported, including one or more of the following: (1) In Review → Provisionally Approved, (2) Approved → Provisionally Approved, (3) Provisionally Approved → Draft, (4) Provisionally Approved → Approved, (5) Provisionally Approved → Rejected, and (6) Provisionally Approved → In review. In example embodiments, the Draft and Twilio Rejected statuses are editable via the Public API or the Console and the In Review status is editable via the administrative user interface.

Figure 4B:
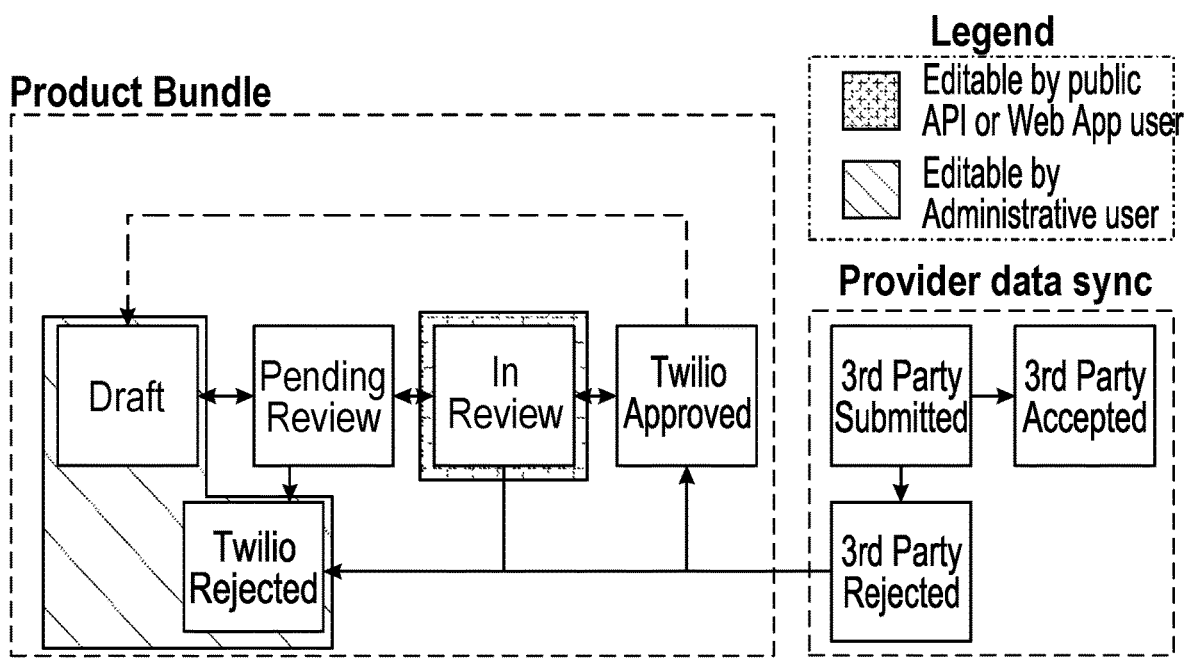
FIG. 4B is a block diagram of an example state machine or enumerated data structure for modeling the status of a bundle when the provisionally-determined status is implicitly determined.

FIG. 4B depicts a block diagram of an example state machine or enumerated data structure for modeling the status of a bundle when the provisionally-determined status is implicitly determined. Here, instead of having an explicit provisionally-approved status, the provisionally-approved status is determined implicitly based on a determination that a regulation associated with the bundle has a valid grace period.

While not depicted in FIGS. 4A and 4B, an additional state machine or enumerated data structure may be used for modeling the state of regulatory documents (e.g., compliance documents) associated with each bundle. In example embodiments, the regulatory documents state machine may also have a provisionally approved status. In example embodiments, the regulatory documents state machine may support various transitions, including one or more of the following: (1) Pending Review ⇒ Provisionally Approved, (2) Approved ⇒ Provisionally Approved, (3) Provisionally Approved ⇒ Rejected, (4) Provisionally Approved ⇒ Draft, (5) Provisionally Approved ⇒ Expired.

FIG. 5. is an example database schema or table corresponding to a bundle. In example embodiments, the example table may be referred to as regulatory compliance table. In example embodiments, the table includes a "valid until" date. In example embodiments, the valid_until specifies a grace period corresponding to one or more regulation updates associated with the bundle. In example embodiments, the valid_until date may be set only by an administrator via the administrative user interface. In example embodiments, the table includes a regulation version. In example embodiments, the regulation bundle allows the bundle to be evaluated against a correct version. The provisionally approved bundle can have the regulation version that was previously approved so that the evaluation doesn't fail. After the bundle transitions to draft status, the regulation version on the bundle may be updated to the latest version. In this way, the provisionally approved bundle may be considered compliant without any required evaluation being bypassed.

Figure 6:
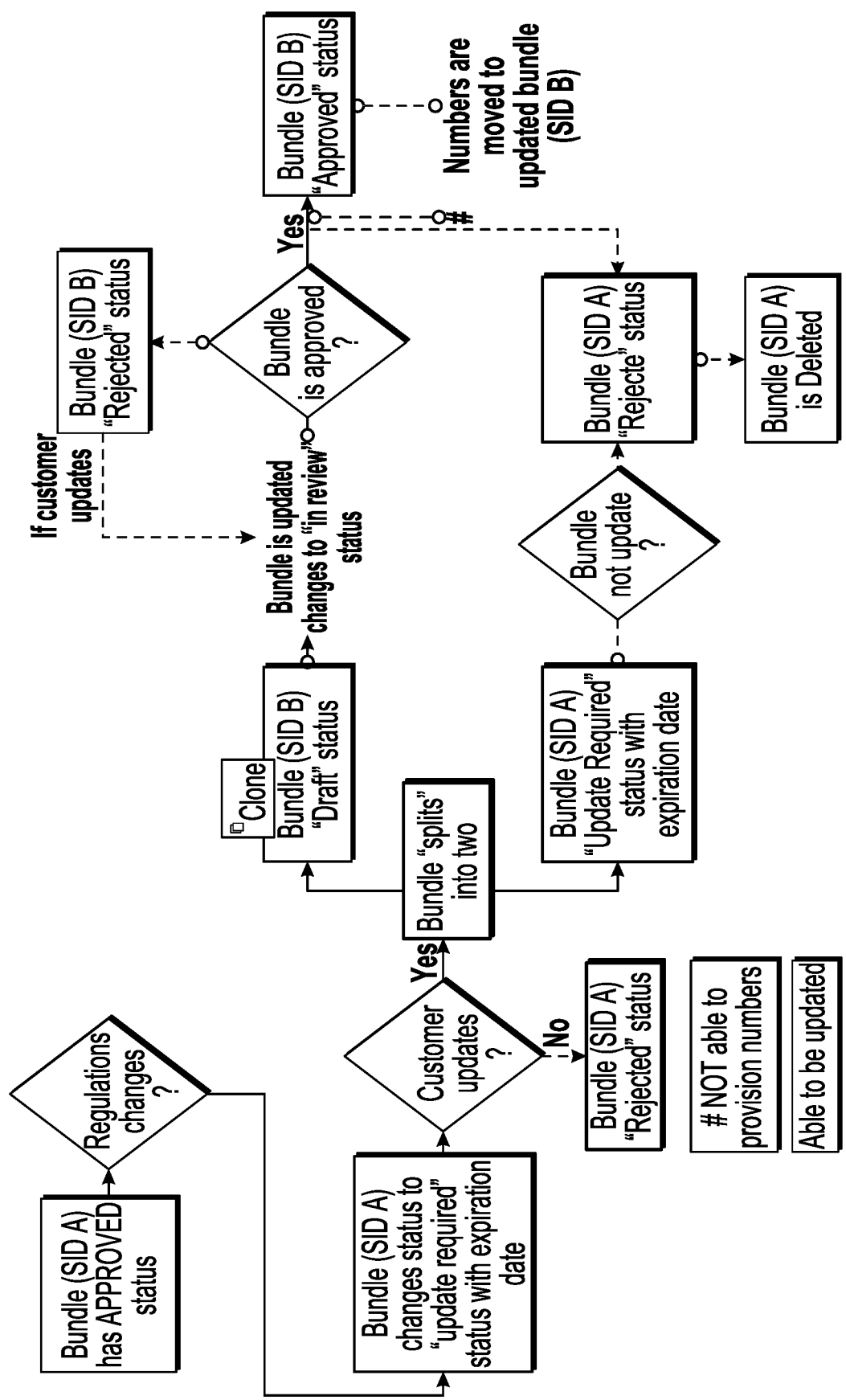
FIG. 6 is a sequence journey depicting, from a customer perspective, an example implementation of a provisionally-approved status for bundles of numbers.

FIG. 6 is a flowchart depicting, from a customer perspective, an example implementation of a provisionally-approved status for bundles of end-point identifiers (e.g., phone numbers). It is determined that a bundle having an approved status will not be compliant with a new regulation after an expiration of a grace period associated with the new regulation.

If it is not possible for the customer to update the bundle with any required documents (e.g., compliance information) before the regulation takes effect, the bundle is set to rejected status. In example embodiments, the customer is not able to provision end-point identifiers from the bundle when the bundle is in the rejected status. However, it may be possible for the customer to update the bundle in order to bring the bundle into compliance with the new regulation, at which point the bundle may eventually be returned to approved status.

If it is possible for the customer to update the bundle with any necessary documents before the regulation takes effect (e.g., if there is a grace period associated with the regulation), the bundle splits into two versions. The first version has a provisionally-approved status. The customer is able to provision end-point identifiers from this first version of the bundle at least until the expiration of the grace period.

If the customer did not update the bundle with any necessary documents before the expiration of the grace period, the bundle is set to rejected status. In example embodiments, based on the bundle being in the rejected status, the bundle, including its end-point identifiers, may be deleted and the end-point identifiers may be reclaimed from the customer.

The second version of the compliance information bundle is a clone of the first version of the compliance information bundle. In example embodiments, the second version of the compliance information bundle is set to draft status. Based on a determination that the customer submitted new compliance documents, the status of the second version is set to In Review. If the compliance information bundle is approved based on the newly submitted compliance documents, the compliance information bundle is set to Approved status. Otherwise, the compliance information bundle is set to Rejected status. Based on the second version of the compliance information bundle being set to the Approved status, the end-point identifiers and/or compliance information associated with the bundle are moved from the first version of the compliance information bundle to the second version of the compliance information bundle.

Figure 7:
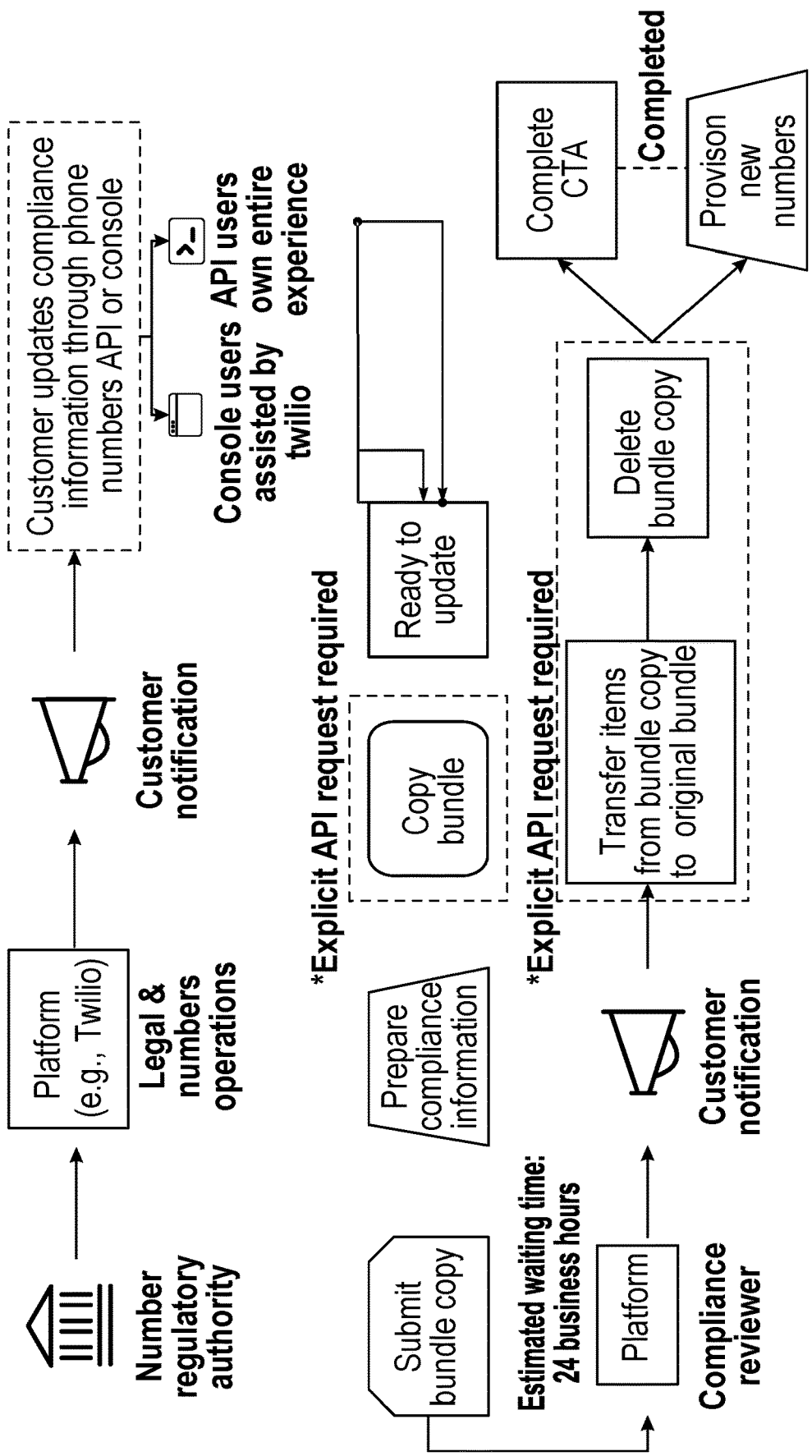
FIG. 7. is a flow chart depicting an example method of updating compliance information for one or more end-point identifiers (e.g., phone numbers) such that they are compliant with one or more new regulations..

FIG. 7. is a flowchart depicting an example method of updating compliance information for one or more end-point identifiers (e.g., phone numbers) such that they conform with one or more new regulatory requirements. In example embodiments, the method 700 may be implemented by the system of FIG. 1.

One or more new regulations are received (e.g., from a regulatory authority).

Based on a determination that the one or more new regulations require one or more updates to compliance information associated with the one or more end-point identifiers, a notification is sent to one or more entities responsible for updating the compliance information (e.g., one or more customers).

One or more updates to the compliance information are received from the one or more entities. In example embodiments, the one or more updates may be sent via a console user interface and/or via one or more API calls.

A copy of the bundle (e.g., compliance information associated with the one or more end-point identifiers) is made (e.g., based on a receiving of an API call from the entity), with the copy containing the one or more updates. In example embodiments, the original bundle is set to a provisionally-compliant state (e.g., during a grace period in which the original bundle is still compliant), allowing the entity to continue to use the bundle while waiting for the updates to the compliance information to be accepted.

The copy of the bundle is received for review. In example embodiments, the bundle is analyzed by a compliance reviewer, which may be a human or an artificial intelligence system. In example embodiments, the artificial intelligence system may be trained by training data pertaining to previous actions taken by a human reviewer (e.g., for similar compliance updates).

The entity is notified whether the bundle has passed compliance review. Based on a passing of the compliance review, the one or more updates to the compliance information may be passed from the copy of the bundle to the original bundle (e.g., based on an API call being received from the entity); additionally, the copy of the bundle may be deleted.

The state of the bundle is restored to an approved state and made available to the entity for use, including after the grace period associated with regulation expires.

Figure 8:
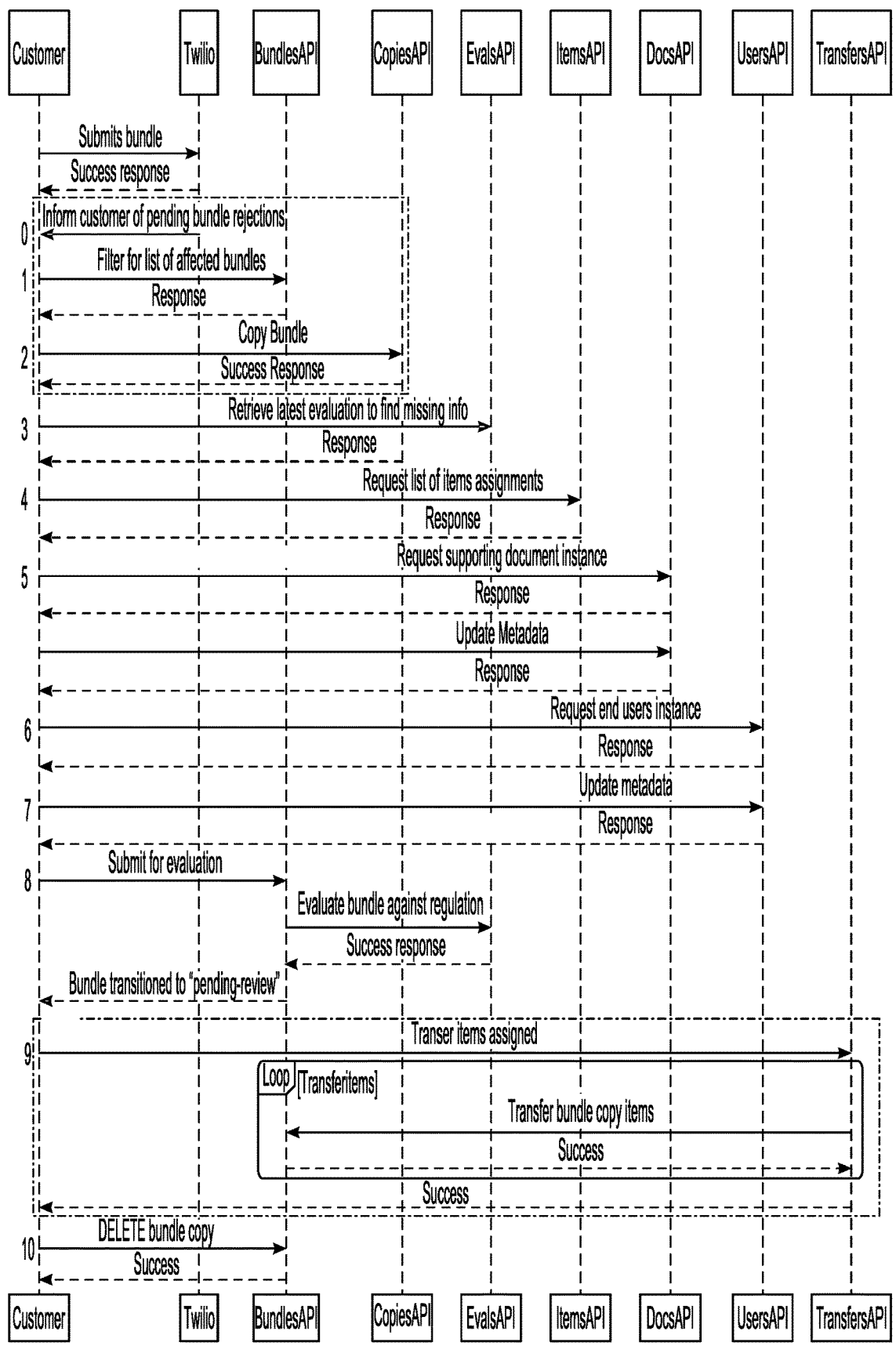
FIG. 8 is a sequence diagram depicting example API calls per resource to filter for all bundles that are soon to be expired and cloning the compliance information for editing.

FIG. 8 is a sequence diagram depicting example calls per resource to filter for all compliance information bundles that are soon to be expired and cloning the bundles for editing.

The customer (e.g,. a client application) submits one or more compliance information bundles to the platform.

The platform informs the customer of any pending compliance information bundle rejections.

The customer calls the Bundles API to filter for a list of affected compliance information bundles.

The customer calls the Bundles API to request an instance of one of the compliance information bundles in the list.

The Bundles API provides a success or failure response.

The customer calls the Rules API (not depicted) to request the newest regulation requirements applicable to the instance of the compliance information.

The customer calls the Bundles API to create a clone or copy of the compliance information.

The customer calls the Items API to retrieve all items assigned to the compliance information.

The customer calls the Docs API to request an instance of a data structure containing supporting documents for the compliance information.

The customer calls the Docs API to update metadata associated with the compliance information.

The customer calls the Bundles API to submit the bundle for evaluation.

The Bundles API calls the Evals API to evaluate the bundle against the regulation.

Based on the bundle transition to the Pending Review status or the Approved status, the customer calls the Bundles API to migrate the end-point identifiers (e.g., phone numbers).

The customer calls the Bundles API to delete the bundle clone.

Figure 9:
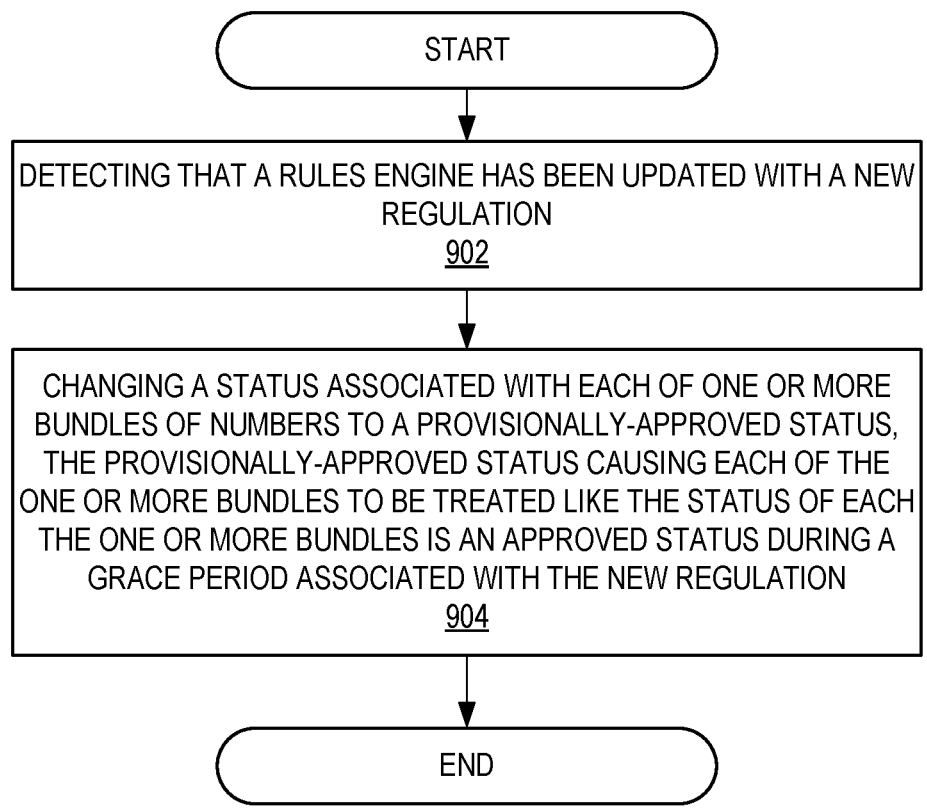
FIG. 9 is a flowchart showing an example method of changing a status of compliance information to provisionally-approved according to certain example embodiments.

FIG. 9 is a flowchart showing an example method 900 of changing a status of compliance information to a provisionally-approved state according to certain example embodiments. The method 900 may be embodied in computer readable instructions for execution by one or more processors such that the operations of the method 900 may be performed in part or in whole (e.g., by the system 100; accordingly, the method 900 is described below by way of example with reference thereto. However, it shall be appreciated that at least some of the operations of the method 900 may be deployed on various other hardware configurations and the method 900 is not intended to be limited to the system 100.

At operation 902, it is determined that a rules engine has been updated (e.g., with a new regulation submitted by a regulatory authority or with a change to the rules engine itself). In example embodiments, the rules engine may be updated based on a creation of a draft of the new regulation and an enacting of the new regulation (e.g., via an administrative user interface).

At operation 904, a status associated with each of one or more compliance information bundles of end-point identifiers is changed to a provisionally-approved status. In example embodiments, the changing of the status of each of the one or more compliance information bundles to the provisionally-approved status is based on a determination that each of the one or more compliance information bundles will no longer be compliant with a regulation when a grace period associated with the regulation has expired. In example embodiments, while each of the one or more compliance information bundles is in the provisionally-approved status, the end-point identifiers included in the one or more compliance information bundles may be used by a customer just as if the compliance information bundles are in approved status, at least until the expiration of the grace period.

In example embodiments, an automated process is triggered when an update to the rules engine is detected. The automated process reevaluates all of the compliance information associated with a regulation affected by the update to determine whether the information is still compliant with the regulation or will still be compliant with the regulation when a grace period associated with the update expires.

SOFTWARE ARCHITECTURE

Figure 10:
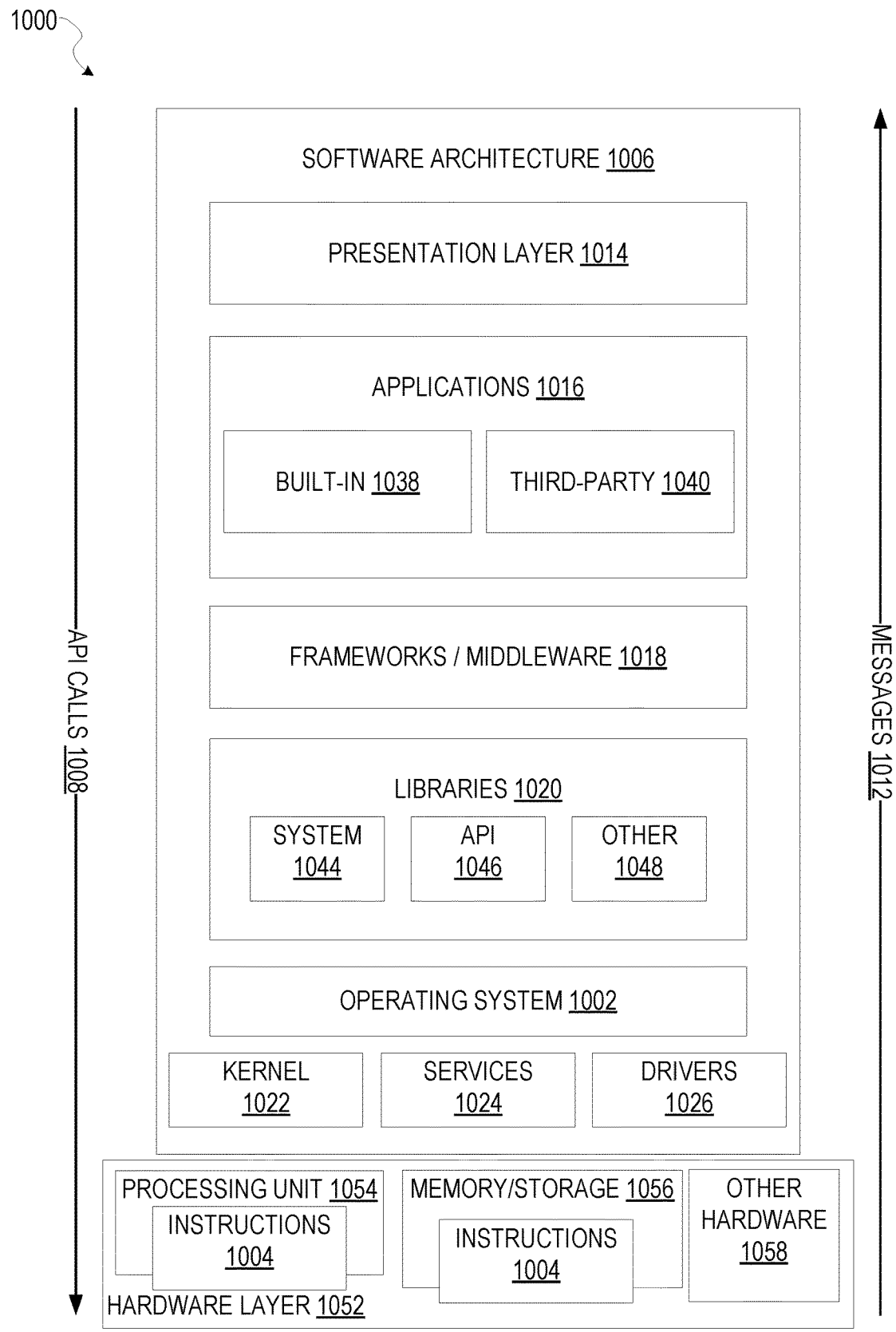
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating an example software architecture 1006, which may be used in conjunction with various hardware architectures herein described. FIG. 10 is a non-limiting example of a software architecture 1006 and it will be appreciated that many other architectures may be implemented to facilitate the functionality described herein. The software architecture 1006 may execute on hardware such as machine 1100 of FIG. 11 that includes, among other things, processors 1104, memory 1114, and (input/output) I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components, and so forth described herein. The hardware layer 1052 also includes memory and/or storage modules 956, which also have executable instructions 1004. The hardware layer 1052 may also comprise other hardware 1058.

In the example architecture of FIG. 10, the software archi Disclosed are systems, methods, and non-transitory computer-readable media for ensuring that one or more compliance information bundles associated with one or more end-point identifiers maintain compliance with one or more regulations. It is detected that a rules engine has been updated with a new regulation. Based on an identification that one or more compliance information bundles associated with the one or more end-point identifiers will not be compliant with the new regulation after an expiration of a grace period associated with the new regulation, a status associated with each one or more compliance information bundles is changed to a provisionally-approved status. The changing of the status associated with each of the one or more compliance information bundles to the provisionally-approved status causes each of the one or more compliance information bundles to be treated, before the expiration of the grace period, temporarily like the status of each the one or more compliance information bundles is an approved status.tecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke application programming interface (API) calls 1008 through the software stack and receive a response such as messages 1012 in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 902 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024, and/or drivers 1026). The libraries 920 may include system libraries 1044 (e.g., C standard library) that may provide functions such as memory allocation functions, string manipulation functions, mathematical functions, and the like. In addition, the libraries 1020 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be used by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024, and/or drivers 1026), libraries 1020, and frameworks/middleware 1018 to create UIs to interact with users of the system. Alternatively, or additionally, in some systems, interactions with a user may occur through a presentation layer, such as presentation layer 1014. In these systems, the application/component "logic" can be separated from the aspects of the application/component that interact with a user.

Figure 11:
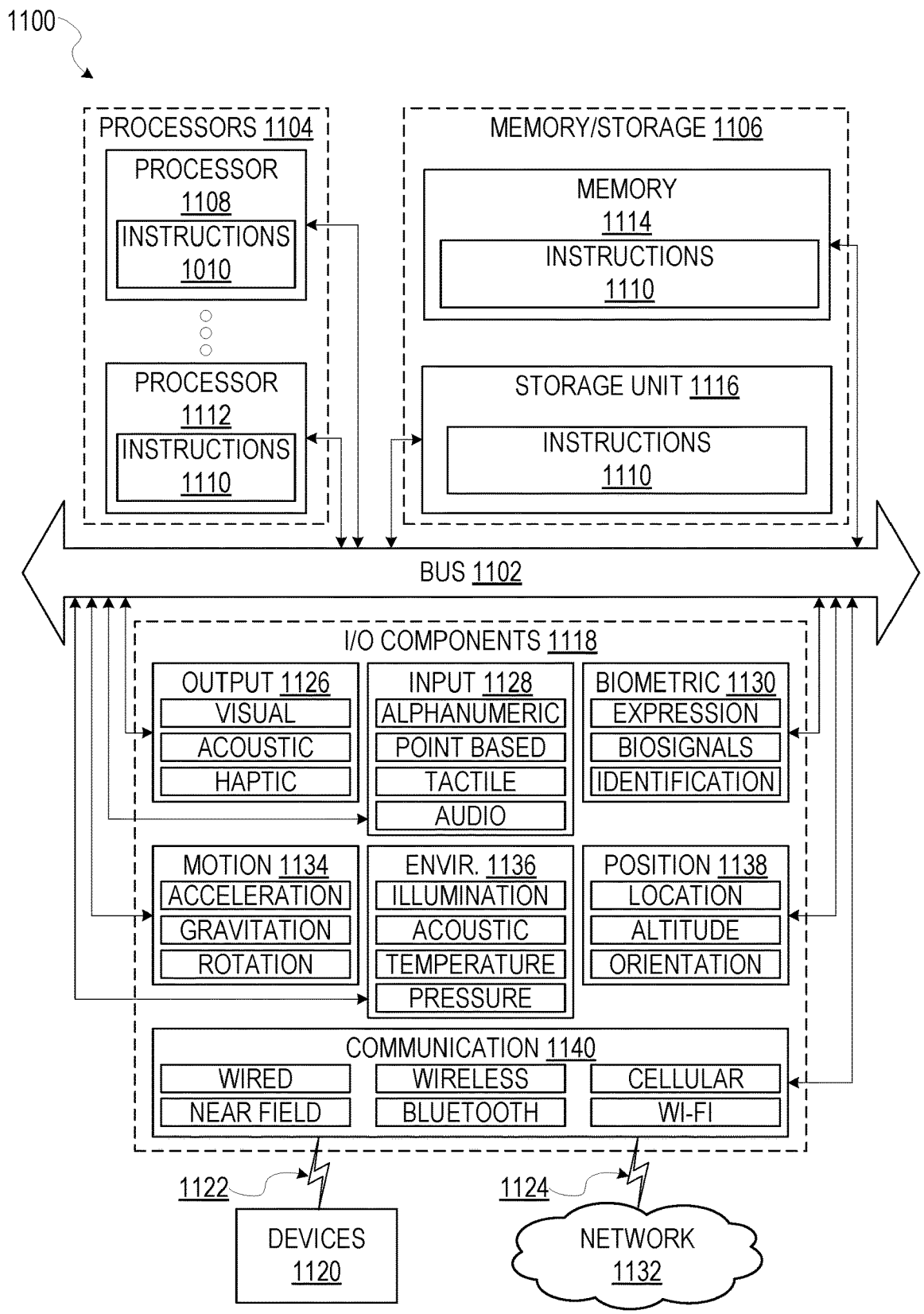
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions 1104 from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1000 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1100 capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processor 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1124 and coupling 1122, respectively. For example, the communication components 1140 may include a network interface component or other suitable device to interface with the network 1132. In further examples, communication components 1140 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1110 for execution by the machine 1100, and includes digital or analog communications signals or other intangible medium to facilitate communication of such instructions 1110. Instructions 1110 may be transmitted or received over the network 1132 using a transmission medium via a network interface device and using any one of a number of well-known transfer protocols.

"CLIENT DEVICE" in this context refers to any machine 1100 that interfaces to a communications network 1132 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1132.

"COMMUNICATIONS NETWORK" in this context refers to one or more portions of a network 1132 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1110 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1110. The term "machine-readable medium" shall also be taken to include any medium, or combination of multiple media, that is capable of storing instructions 1110 (e.g., code) for execution by a machine 1100, such that the instructions 1110, when executed by one or more processors 1104 of the machine 1100, cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1104) may be configured by software (e.g., an application 416 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1104 or other programmable processor 1104. Once configured by such software, hardware components become specific machines 1100 (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1104 configured by software to become a special-purpose processor, the general-purpose processor 1104 may be configured as respectively different special-purpose processors (e.g., comprising different hardware components) at different times. Software accordingly configures a particular processor or processors 1104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1102) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1104 that are temporarily configured (e.g., by software) or permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a network 1132 (e.g., the Internet) and via one or more appropriate interfaces (e.g., an API). The performance of certain of the operations may be distributed among the processors 1104, not only residing within a single machine 1100, but deployed across a number of machines 1100. In some example embodiments, the processors 1104 or processor-implemented components may be located in a single geographic location (e.g., within a home environment, an office environment, or a server farm). In other example embodiments, the processors 1104 or processor-implemented components may be distributed across a number of geographic locations.

"PROCESSOR" in this context refers to any circuit or virtual circuit (a physical circuit emulated by logic executing on an actual processor 1104) that manipulates data values according to control signals (e.g., "commands," "op codes," "machine code," etc.) and which produces corresponding output signals that are applied to operate a machine 1100. A processor 1104 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1104 may further be a multi-core processor having two or more independent processors 1104 (sometimes referred to as "cores") that may execute instructions 1110 contemporaneously.

What is claimed is:

1. A method comprising:
    detecting, using one or more computer processors, that a rules engine has been updated with a new regulation; and
    based on a determination that the new regulation is associated with a grace period and an identification that each of one or more compliance information bundles associated with one or more end-point identifiers that had a status of approved before the updating of the rules engine is not compliant with the new regulation, changing the status of each of the one or more compliance information bundles to a provisionally-approved status, the provisionally-approved status causing each of the one or more compliance information bundles to be treated like the status of each the one or more compliance information bundles remains approved until an expiration of the grace period.

2. The method of claim 1, based on a determination that compliance information associated with the new regulation has not been submitted before an expiration of the grace period, changing the status of each of the one or more compliance information bundles to a rejected status.

3. The method of claim 2, further comprising, based on the determination, reclaiming the one or more end-point identifiers in the one or more compliance information bundles.

4. The method of claim 1, further comprising, based on a determination that compliance information associated with the new regulation has been submitted and approved before an expiration of the grace period, changing the status associated with each of the one or more compliance information bundles to the approved status.

5. The method of claim 4, wherein the determination that the compliance information associated with the new regulation has been submitted is based on a determination that the status of each of the one or more compliance information bundles was changed to a draft status and an in-review status before the changing of the status to the approved status.

6. The method of claim 1, further comprising, based on the identification, sending a communication that specifies a reason for the changing of the status and an action required to change the status of each of the one or more compliance information bundles to the approved status.

7. The method of claim 6, wherein the communication identifies the compliance information.

8. A non-transitory computer-readable storage medium storing instructions that, when executed by one or more computer processors, causes the one or more computer processors to perform operations, the operations comprising:
    detecting that a rules engine has been updated with a new regulation; and
    based on a determination that the new regulation is associated with a grace period and an identification that each of one or more compliance information bundles associated with one or more end-point identifiers that had a status of approved before the updating of the rules engine is not compliant with the new regulation, changing the status of each of the one or more compliance information bundles to a provisionally-approved status, the provisionally-approved status causing each of the one or more compliance information bundles to be treated like the status of each the one or more compliance information bundles remains approved until an expiration of the grace period.

9. The non-transitory computer-readable storage medium of claim 8, based on a determination that compliance information associated with the new regulation has not been submitted before an expiration of the grace period, changing the status of each of the one or more compliance information bundles to a rejected status.

10. The non-transitory computer-readable storage medium of claim 9, further comprising, based on the determination, reclaiming the one or more end-point identifiers in the one or more compliance information bundles.

11. The non-transitory computer-readable storage medium of claim 8, further comprising, based on a determination that compliance information associated with the new regulation has been submitted and approved before an expiration of the grace period, changing the status associated with each of the one or more compliance information bundles to the approved status.

12. The non-transitory computer-readable storage medium of claim 11, wherein the determination that the compliance information associated with the new regulation has been submitted is based on a determination that the status of each of the one or more compliance information bundles was changed to a draft status and an in-review status before the changing of the status to the approved status.

13. The non-transitory computer-readable storage medium of claim 8, further comprising, based on the identification, sending a communication that specifies a reason for the changing of the status and an action required to change the status of each of the one or more compliance information bundles to the approved status.

14. A system comprising:
    one or more computer processors;
    one or more computer memories; and
    a set of instructions stored in the one or more computer memories, the set of instructions configuring the one or more computer processors to perform operations, the operations comprising:
    detecting that a rules engine has been updated with a new regulation; and
    based on a determination that the new regulation is associated with a grace period and an identification that each of one or more compliance information bundles associated with one or more end-point identifiers that had a status of approved before the updating of the rules engine is not compliant with the new regulation, changing the status of each of the one or more compliance information bundles to a provisionally-approved status, the provisionally-approved status causing each of the one or more compliance information bundles to be treated like the status of each the one or more compliance information bundles remains approved until an expiration of the grace period.

15. The system of claim 14, based on a determination that compliance information associated with the new regulation has not been submitted before an expiration of the grace period, changing the status of each of the one or more compliance information bundles to a rejected status.

16. The system of claim 15, further comprising, based on the determination, reclaiming the one or more end-point identifiers in the one or more compliance information bundles.

17. The system of claim 14, further comprising, based on a determination that compliance information associated with the new regulation has been submitted and approved before an expiration of the grace period, changing the status associated with each of the one or more compliance information bundles to the approved status.

18. The system of claim 17, wherein the determination that the compliance information associated with the new regulation has been submitted is based on a determination that the status of each of the one or more compliance information bundles was changed to a draft status and an in-review status before the changing of the status to the approved status.

19. The system of claim 14, further comprising, based on the identification, sending a communication that specifies a reason for the changing of the status and an action required to change the status of each of the one or more compliance information bundles to the approved status.

20. The system of claim 19, wherein the communication identifies the compliance information.

* * * * *